(12) United States Patent
Mowery, Jr.

(10) Patent No.: US 6,492,897 B1
(45) Date of Patent: Dec. 10, 2002

(54) SYSTEM FOR COUPLING WIRELESS SIGNALS TO AND FROM A POWER TRANSMISSION LINE COMMUNICATION SYSTEM

(76) Inventor: Richard A. Mowery, Jr., 911 Morning Sun La., McGregor, TX (US) 76657

( * ) Notice: Subject to any disclaimer, the term of this patent is extended or adjusted under 35 U.S.C. 154(b) by 0 days.

(21) Appl. No.: 09/632,320

(22) Filed: Aug. 4, 2000

(51) Int. Cl.[7] ............................................. H04M 11/04
(52) U.S. Cl. ........................... 340/310.01; 340/310.02; 340/313; 340/505; 340/870.03; 340/870.11
(58) Field of Search ....................... 340/310.01, 310.02, 340/313, 870.03, 870.11, 505

(56) References Cited

U.S. PATENT DOCUMENTS

| | | | |
|---|---|---|---|
| 223,898 A | 1/1880 | Edison | |
| 2,032,360 A | 3/1936 | Green | |
| 2,264,395 A | 12/1941 | Mitchell | |
| 2,264,396 A | 12/1941 | Moore | |
| 3,656,112 A | * 4/1972 | Paull | 340/310 |
| 4,462,113 A | 7/1984 | Iwata | |

(List continued on next page.)

FOREIGN PATENT DOCUMENTS

| | | |
|---|---|---|
| WO | 9957878 | 11/1999 |
| WO | 9743740 | 10/2000 |

*Primary Examiner*—Jeffery Hofsass
*Assistant Examiner*—Hung T Nguyen (57) ABSTRACT

A system for communicating information to and from untethered subscriber devices and tethered devices by the use of a power transmission line communication system interfacing to a conventional electric power distribution network. Untethered subscriber devices and tethered devices will be able to send and receive impulse or modulated signals. The coupling system to and from a power transmission line is a tethered device housed entirely in an enclosure able to replace a sunlight detector affixed to a street pole, or to plug into an outlet, or to attach around a transmission line, or screw into a light socket. A battery supplies energy to the tethered device screwed into a light socket when no electricity flows to the socket. A tethered device attached around a transmission line is powered by magnetic induction and interfaces through a power transmission communication system. The tethered device interfaces directly to the electrical lines by means of a power transmission communication system. The tethered device is able to connect untethered subscriber device to a plurality of untethered devices and tethered devices to establish a personal, local, or wide area network. The tethered device is capable of locating other tethered devices and untethered subscriber devices, and using this positioning to adjust the signal power, and to handoff untethered subscriber devices.

9 Claims, 7 Drawing Sheets

U.S. PATENT DOCUMENTS

| | | | |
|---|---|---|---|
| 4,471,399 A | | 9/1984 | Udren |
| 4,614,945 A | * | 9/1986 | Brunius et al. ......... 340/870.03 |
| 4,799,059 A | * | 1/1989 | Grindahl et al. ....... 340/870.03 |
| 5,485,150 A | * | 1/1996 | Hisanaga et al. ...... 340/870.02 |
| 5,553,094 A | * | 9/1996 | Johnson et al. ........ 340/870.03 |
| 5,554,968 A | | 9/1996 | Lee |
| 5,559,377 A | | 9/1996 | Abraham |
| 5,633,888 A | | 5/1997 | Stewart |
| 5,664,194 A | | 9/1997 | Paulsen |
| 5,670,931 A | | 9/1997 | Besser et al. |
| 5,684,450 A | | 11/1997 | Brown |
| 5,802,173 A | | 9/1998 | Hamilton-Piercy |
| 5,815,538 A | | 9/1998 | Grell |
| 5,818,828 A | | 10/1998 | Packer |
| 5,832,364 A | | 11/1998 | Gustafson |
| 5,864,284 A | | 1/1999 | Sanderson |
| 5,892,758 A | | 4/1999 | Argyroudis |
| 5,903,566 A | | 5/1999 | Flammer |
| 5,937,342 A | | 8/1999 | Kline |
| 5,949,327 A | | 9/1999 | Brown |
| 5,952,914 A | | 9/1999 | Wynn |
| 5,969,663 A | | 10/1999 | Fullerton |
| 5,982,276 A | | 11/1999 | Stewart |
| 5,983,073 A | * | 11/1999 | Ditzik ....................... 455/11.1 |
| 5,994,998 A | | 11/1999 | Fisher |
| 6,006,212 A | * | 12/1999 | Schleich et al. ....... 340/870.02 |
| 6,031,862 A | | 2/2000 | Fullerton |
| 6,035,197 A | | 3/2000 | Haberman |
| 6,035,199 A | | 3/2000 | Barnett |
| 6,040,759 A | | 4/2000 | Sanderson |
| 6,047,199 A | | 4/2000 | DeMarco |
| 6,085,091 A | | 7/2000 | Yoo |
| 6,130,896 A | | 10/2000 | Lueker et al. |
| 6,140,911 A | | 10/2000 | Fisher |
| 6,154,488 A | * | 11/2000 | Hunt ..................... 340/310.01 |
| 6,172,597 B1 | | 1/2001 | Brown |
| 6,205,332 B1 | | 3/2001 | Novel |
| 6,243,571 B1 | | 5/2001 | Bullock et al. |
| 6,249,671 B1 | | 6/2001 | Tucker et al. |
| 6,259,898 B1 | | 7/2001 | Lewis |
| 6,275,144 B1 | | 8/2001 | Rumbaugh |
| 6,274,144 B1 | | 9/2001 | Rumbaugh |
| 6,278,877 B1 | | 9/2001 | Brederveld et al. |
| 6,144,292 A1 | | 11/2001 | Brown |
| 6,327,470 B1 | | 12/2001 | Ostling |
| 6,334,047 B1 | | 12/2001 | Andersson et al. |
| 6,360,100 B1 | | 3/2002 | Grob et al. |
| 6,360,264 B1 | | 3/2002 | Rom |
| 6,366,561 B1 | | 4/2002 | Bender |
| 6,377,805 B1 | | 4/2002 | Anvekar et al. |

* cited by examiner

SYSTEM FOR COUPLING WIRELESS SIGNALS TO AND FROM A POWER TRANSMISSION LINE COMMUNICATION SYSTEM

BACKGROUND—DESCRIPTION OF PRIOR ART

Class: 340/310.01; 455/402; 375; 342; 370/213; 315/291
(no patents reference this one)

| Patent | Issued | Inventor(s) | Applicant(s) | Title |
|---|---|---|---|---|
| U.S. Pat. No. 223898 | January 1880 | Thomas Edison | None | Electric Lamp |
| U.S. Pat. No. 6016038 | January 2000 | Mueller; George A. et. al. | Color Kinetics, Inc. | Multi-colored LED lighting method and apparatus |
| U.S. Pat. No. 2032360 | | | | |
| U.S. Pat. No. 2264395 | | | | |
| U.S. Pat. No. 2264396 | | | | |
| U.S. Pat. No. 4471399 | September 1984 | Udren | Westinghouse Electronic Corporation | Power-line baseband communication system |
| U.S. Pat. No. 5559377 | September 1996 | Lee | None | Data Communication using power lines |
| U.S. Pat. No. 5982276 | November 1999 | Stewart; William L. | Media Fusion | Magnetic field based power transmission line communication method and system |
| U.S. Pat. No. 4471399 | September 1984 | Udren | Westinghouse Electric Corp. | Power-line baseband communication system |
| U.S. Pat. No. 5554968 | September 1996 | Lee; Raymond | None | Data Communication using power lines |
| U.S. Pat. No. 5670931 | September 1997 | Besser et. al. | Baker Hughes Incorporated | Method and apparatus for transmitting data over a power cable utilizing a magnetically saturable core reactor. |
| U.S. Pat. No. 5684450 | November 1997 | Brown; Paul Anthony | Norweb PLC | Electricity distribution and/or power transmission network and filter for telecommunication over power lines |
| U.S. Pat. No. 4462113 | July 1984 | Iwata; Keisuke | Iwata Electric Company, Ltd. | Cordless transmitting and receiving apparatus |
| U.S. Pat. No. 6040759 | April 2000 | Sanderson; Lelon W. | None | Communication system for providing broadband data services using a high-voltage cable of a power system |
| U.S. Pat. No. 5952914 | September 1999 | Wynn; Woodson D. | AT&T Corp. | Power line communications system |
| U.S. Pat. No. 6031862 | February 2000 | Fullerton; Larry W. | Time Domain Corporation | Ultrawide-band communication system and method |
| U.S. Pat. No. 5969663 | October 1999 | Fullerton; Larry W. | Time Domain Corporation | Time domain radio transmission system |
| U.S. Pat. No. 6085091 | July 2000 | Yoo; Dong Hwa et. al. | Electronics and Telecom. Research Inst. | Method for controlling hand off of mobile terminal in code division multiple access mobile communication system |
| U.S. Pat. No. 5832364 | November 1998 | Gustafson; Warren H. | AirNet Comm. Corp | Distributing wireless system carrier system within a building using existing power line wiring |
| U.S. Pat. No. 6047199 | April 2000 | DeMarco; Anthony T. | Bellsouth Intellectual Property Corporation | Systems and methods for transmitting mobile radio signals |
| U.S. Pat. No. 5949327 | September 1999 | Brown; Paul A. | Norweb PLC | Coupling of telecommunication signals to a balanced power distribution network |
| U.S. Pat. No. 5937342 | August 1999 | Kline; Paul A. | Dynamic Telecommunications | Wireless local distribution system using standard power lines |
| U.S. Pat. No. 5864284 | January 1999 | Sanderson; Lelon W. | None | Apparatus for coupling radio-frequency signals to and from a cable of a power distribution network |
| U.S. Pat. No. 6035199 | March 2000 | Barnett; Charles A. | Hughes Electronics Corporation | Method and apparatus for performing a handoff in a wireless communication system |
| U.S. Pat. No. 6035197 | March 2000 | Raberman; Michael | Cellco Partnership | Method and system for providing a handoff from a CDMA cellular telephone system |
| U.S. Pat. No. 5815538 | September 1998 | Grell; Conrad et. al. | Omniplex, Inc. | Method and apparatus for determining location of a subscriber device in a wireless cellular communications system |
| U.S. Pat. No. 5802173 | Sept. 1, 1998 | Hamilton-Piercy; Nicholas Francis et. al. | Rogers Cable System Limited | Radiotelephony System |
| U.S. Pat. No. 5809395 | September 1998 | Hamilton-Piercy; Nicholas Francis et. al. | Rogers Cable System Limited | Remote antenna driver for a radio telephone system |

-continued

| Patent | Issued | Inventor(s) | Applicant(s) | Title |
| --- | --- | --- | --- | --- |
| WO9957878 | November 1999 | Stewart; William L. | Media Fusion Corp | Magnetic field based power transmission line communication method and system |
| WO9743740 | November 1997 | Devereaux; Kevin et. al. | Micron Communications | Radio Frequency Data Communication Device |

Thomas Edison was the inventor of the electric light bulb which has influenced in one way or another every human being in the world. U.S. Pat. No. 223,898 is a basic building block of many inventions considering the electric light bulb as prior art. The electric light bulb installs quickly and is cost effective compared to the wax candle or oil-burning lamp. However, Thomas Edison never envisioned that his invention would one day help third world countries and rural areas obtain the necessary technology to compete with urban centers. The light bulb was used as a way to communicate information by turning on and off the bulb in a pattern. However, the light bulb was never operated as a wireless communication base for sending and receiving large bandwidth data. Moreover, the light bulb was never envisioned to interface with a power communications system. To date, however, no system has been proposed which makes effective use of the extensive and growing bi-directional networks of power transmission lines already existing or installed, particularly in urban and suburban areas, for wireless data communication purposes.

As stated in U.S. Pat. No 5,982,276, the use of power transmission lines as a communication media is well known in the art with some of the earliest work dating back to the 1930's in an effort to provide telephone communication to rural areas which had not yet been served by telephone lines, such as the type of prior art systems described in U.S. Pat. Nos. 2,032,360; 2,264,395; and 2,264,396. These systems, which employed carrier waves superposed on the electrical component of the electromagnetic radiation carried over the phone transmission line, were strictly analog in nature and were not particularly successful because of the inherent limitations of the analog bandwidth, signal attenuation, electromagnetic noise and the inability to handle more than one call at a time. The need to transmit information through the power transformers also proved an impediment to a successful communication system. Attempts have also been made to overcome these problems through the use of digital signal transmission instead of an analog carrier wave, but still utilizing the electrical component of the electromagnetic radiation carried over the power transmission line, such as disclosed in U.S. Pat. Nos. 6,040,759; 5,684,450; 5,670,931; 5,952,914; 5,949,327; 5,554,968; 5,559,377; and 4,471,399, as well as the use of digital packets to try to overcome the noise problem, but these attempts have also been unsatisfactory and too costly.

U.S. Pat No. 5,982,276 overcomes the problems of bandwidth, signal attenuation, electromagnetic noise, power transformer impediment, and the inability to handle more than one call at a time by wire transmission of data using a magnetic field component for enabling voice and data communication over power lines. This invention allows subscribers to send and receive data at an unprecedented bandwidth of 2.5 Gigabytes per second. The disadvantage of this patent is that the only reference to wireless communication is by the interface to a conventional microwave tower that interfaces to a standard power transmission line through a magnetic based power communication system. This reference allows wireless subscribers to the power communication network to interface with other conventional telephone wireless users not connected to the power communication network. The use of a microwave tower is expensive, is non-upgradeable, needs professional installation, needs an extensive installation period, is bandwidth limited, is frequency limited, is coverage area limited, works independently of other microwave towers, needs special construction governmental permits, has constant output power, has high signal radiation, is environmentally unfriendly, and has a large visual profile.

U.S. Pat. Nos. 6,031,862 and 5,969,663 describe an impulse radio communication system using one or more sub-carriers to communicate information from an impulse radio transmitter to an impulse radio receiver. The impulse radio communication system is an ultrawide-band time domain system. The use of sub-carriers provides impulse radio transmissions added channelization, smoothing and fidelity. Sub-carriers of different frequencies or waveforms can be used to add channelization of impulse radio signals. Thus, an impulse radio link can communicate many independent channels simultaneously by employing different sub-carriers for each channel. The advantage of impulse radio is the fact that it substantially increases the data bandwidth while decreasing the input and output signal power. The disadvantage to this type of wireless modulation is the fact that the invention has never been coupled to a power transmission line through a power communication network.

U.S. Pat. No. 5,832,365 tries to distribute wireless signals within a building using existing power line wiring. The disadvantage of this patent is that the wireless signals cannot connect other wireless subscribers outside the building over the power transmission line. U.S. Pat. No. 6,047,199 is a recent invention that described a mobile cellular phone network but does not interface with a power communication network.

U.S. Pat. No. 4,462,113 consists of a cordless transmitting and receiving apparatus which is capable of providing transmitting and receiving between a key transmitting and receiving apparatus such as a telephone and a portable remote transmitting and receiving apparatus and in which a transmission signal from the key transmitting and receiving apparatus is received in the remote transmitting and receiving apparatus by electromagnetic induction through a commercial AC power line. The cordless transmitting and receiving apparatus has a relay transmitter, which transmits a transmission signal from said remote transmitting and receiving apparatus to said key transmitting and receiving apparatus through said AC line. The receiving circuit of said key transmitting and receiving apparatus is electrically connected to said AC line whereby the transmission signal from said transmitting and receiving apparatus is transmitted to said relay transmitter in a wireless fashion and transmitted between said relay transmitter and said key transmitting and receiving apparatus by said AC line. The disadvantage of this patent is that the wireless signals cannot connect other wireless subscribers outside the building over the power transmission line. Also, the invention is expensive, is bandwidth limited, is frequency limited, and is coverage area limited.

U.S. Pat. Nos. 5,802,173 and 5,809,395 are inventions that relate to the interface between a telephone network and wireless mobile telephone units in a radiotelephony system and more particularly to equipment for the implementation of a mobile communications service utilizing a fixed distribution network incorporating a layer between base stations and associated antennas, the layer incorporating two way optical fiver and/or coaxial cable signal transport facilities. The disadvantage to this type of radiotelephony system is that these patent have never been coupled to a power transmission line through a power communication network.

U.S. Pat. Nos. 6,085,091; 6,035,199; and 6,035,197 are methods that deal with the handoff of mobile and wireless communication systems using different modulation schemes. U.S. Pat. No. 5,815,538 is a method and apparatus for determining a location of a subscriber device in a wireless cellular communications network by using timing information from three different nearby wireless towers. The disadvantage to these patents is that these inventions have never been coupled to a power transmission line through a power communication network.

U.S. Pat. No. 5,937,342 is a system and method to connect standard telephone subscriber equipment (telephone, facsimile, personal computer) to a fixed wireless terminal via power lines. The system comprises fixed wireless terminals connected to a power line interface device. Subscriber equipment is connected to the power line interface device thereby allowing telecommunication signals to be transmitted to the fixed wireless terminal for subsequent wireless transmission. The fixed wireless terminal exists at an individual subscriber's home/business within a given step-down power transformer cluster. The step-down power transformer provides signal isolation so that the same or similar addresses can be used between clusters without confusion as to the identity of the individual subscriber. The fixed wireless terminal is also connected to the power meter at a subscriber location such that power utilization can be communicated to the power company in a wireless fashion. The disadvantage of this invention is that it only allows the power company to see vital statistics of electrical usage while not allowing the power communication network to function beyond the local transformer. The invention also does not allow multiple wireless subscribers to utilize the power communication system.

U.S. Pat. No. 5,864,284 is a coupling system for transferring a radio-frequency signal to and from a high-voltage cable of a power distribution system. In one embodiment the coupling system uses a lightning arrester as an element for coupling a radio-frequency signal from a radio-frequency modem to and from the high-voltage cable. An impedance element of the coupling system is a section of a grounding cable modified with one or more ferrite cores as a means for adjusting the value of the impedance. The disadvantage of this patent is that the coupling frequency has to be between one Megahertz and two hundred Megahertz. This limits the overall system bandwidth and frequency. Another disadvantage of this invention is that it has to use a lightning arrester with a large capacitance and impedance and uses a radio-frequency modem to couple the radio-frequency signal to a power transformer line. This unique and novel need makes this invention neither cost effective nor commercially available in large numbers. A final disadvantage of this coupling system is the need for one or more ferrite cores as a means for adjusting the value of impedance. The need to transmit information through the power transformers also proved an impediment to this patent. World Pat. No. WO9743740 is a radio frequency identification device that includes an integrated circuit (16) including a receiver (30), a transmitter (32), and a microprocessor (34). The receiver and transmitter together define an active transponder. The integrated circuit is preferably a monolithic single die integrated circuit including the receiver, the transmitter, and the microprocessor. Because the device includes an active transponder, instead of a transponder that relies on magnetic coupling for power, the device has a much greater range. The disadvantage to these patents is that this invention has never been coupled to a power transmission line through a power communication network As stated in U.S. Pat. No. 5,864,284, because of the well established power transmission infrastructure, and the increasing need for higher speed, higher capacity, and greater distribution of information of all types over great distances, particularly wireless communications today, there is a continuing and increasing need to develop a satisfactory and cost effective communication system which takes advantage of the vast and well established power transmission line distribution network already in place throughout the world.

As stated in U.S. Pat. No. 5,802,173, high capacity, low cost portable grade radiotelephone service will place additional burdens on the urban cellular frequency spectrum. Additionally, the cost of sites for radio base stations and antennae installations, and difficulties in construction and maintenance access during busy road traffic periods, require a more cost effective means for providing wireless communications if the urban and rural demand for service is to be met. This is one of the main purposes of the invention disclosed herein.

SUMMARY

In accordance with the present invention a coupling system transfers wireless signals to and from a power transmission line. In a presently preferred embodiment, a system for coupling a wireless signal to a power transmission line by electrically interfacing with a power transmission line communication system is integrated with an electric light bulb that can physically attach to any power transmission line. In an additional embodiment, a system for coupling a wireless signal to a power transmission line by electrically interfacing with a power transmission line communication system is built into an electrical outlet. In another additional embodiment, a system for coupling a wireless signal to a power transmission line by electrically interfacing with a power transmission line communication system is integrated into a device that can physically attach to any power transmission line.

OBJECTS AND ADVANTAGES

Accordingly, besides the objects and advantages of the wireless communication system & interface described in the above patent, several objects and advantages of the present invention are:

(a) to provide a system for coupling wireless signals to power lines which can be distributed by vending machines, general stores, government agencies, education organizations, and internet shopping sites;

(b) to provide a system for coupling wireless signals to power lines which cannot be altered for safety and security concerns;

(c) to provide a system for coupling wireless signals to power lines which can effortlessly clamp onto and be powered by any power transmission line;

(d) to provide a system for coupling wireless signals to power lines which can be effortlessly screwed into a light bulb outlet or attached to or near a light bulb;

(e) to provide a system for coupling wireless signals to power lines which has an integrated or retractable antennae design;

(f) to provide a system for coupling wireless signals to power lines which can also function as a nightlight or street lamp by sensing lighting conditions;

(g) to provide a system for coupling wireless signals to power lines which can be interfaced to a magnetic or electrical power line communication system through an outlet attachment, power transmission line attachment, or integrated circuit;

(h) to provide a system for coupling wireless signals to power lines whose wireless component is based on the techniques of modern modulation of the signal such as analog modulation, frequency modulation, amplitude modulation, phase modulation, QPSK modulation, GSM, CDMA, TDMA, or ultra-wide band time domain based technology;

(i) to provide a system for coupling wireless signals to power lines whose radio frequency component is secure and has a high data bandwidth;

(j) to provide a system for coupling wireless signals to power lines whose data or video information passing thru the system & interface is based on a standard specification with secure protocols such as TCP/IP, ATM, IEEE 802.11, HiperLan, and Bluetooth;

(k) to provide a system for coupling wireless signals to power lines which can allow a specific representative to increase or decrease the level of security depending on the physical location;

(l) to provide a system for coupling wireless signals to power lines which can communicate through a secure protocol with objects such as home appliances, consumer electronic devices, computer devices, motor vehicles, airplanes, boats, lighting, smart card readers, credit card readers, or security systems;

(m) to provide a system for coupling wireless signals to power lines which creates a secure personal area network which can seamlessly transfer connected devices to other local personal area networks, dialup networks, cable modem networks, digital subscriber line networks, cellular networks, or wide area networks;

(n) to provide a system for coupling wireless signals to power lines whose personal area network can be easily integrated with a digital signal processor or microprocessor;

(o) to provide a system for coupling wireless signals to power lines whose personal area network can share its resources and processing power with other networks to create a parallel processing network.

(p) to provide a system for coupling wireless signals to power lines which can function as a radar system for security and identification purposes;

(q) to provide a system for coupling wireless signals to power lines which can act like a global positioning system to determine exact distances and position of objects;

(r) to provide a system for coupling wireless signals to power lines which can find other networks and wireless devices so as to limit or expand its transmission power to exactly match the distance between these networks & wireless devices;

(s) to provide a system for coupling wireless signals to power lines which can be used to securely purchase or sell objects;

(t) to provide a system for coupling wireless signals to power lines which can allow a consumer to share other wireless devices or systems for coupling wireless devices to a power communication system;

(u) to provide a system for coupling wireless signals to power lines which can instantaneously track the movement of products, individuals, criminals, or individuals carrying visas and passports;

(v) to provide a system for coupling wireless signals to power lines which can allow a wireless infrastructure to operate without interference inside solid structures;

(w) to provide a system for coupling wireless signals to power lines which can instantaneously track consumers using electronic tickets, needing to pay tolls or taxes;

(x) to provide a system for coupling wireless signals to power lines which is environmentally and visually friendly compared to modem and expensive cellular towers;

(y) to provide a system for coupling wireless signals to power lines which can communicate with other devices by using communication methods like infrared, visible light, laser light, ultraviolet, magnetic, ultrasonic, or sound medium;

(z) to provide a system for coupling wireless signals to power lines which can retrieve statistics, evaluate fingerprints, organize data into the correct network protocol, compress data in real time, understand voice content, read bar codes, and manipulate data by conventional algorithms;

(aa) to provide a system for coupling wireless signals to power lines which has the ability to track and control public transportation or motor vehicles according to safety and government regulations;

(bb) to provide a system for coupling wireless signals to power lines which can automatically independently search and locate itself and others devices on the Internet by a specific identification number or domain name;

(cc) to provide a system for coupling wireless signals to power lines which can offer increased wireless bandwidth, increase in the number of wireless sites, and decrease in total power output;

(dd) to provide a system for coupling wireless telephone, television or radio signals to a power communication network.

(ee) to provide a system for coupling wireless signals to power lines which can instantaneously synchronize various databases such as tasks, addresses, and calendar to various devices;

(ff) to provide a system for coupling wireless signals to power lines which can provide important information to disabled people such as object positioning;

(gg) to provide a system for coupling wireless signals to power lines which can track monetary instruments;

Still further objects and advantages will become apparent from a consideration of the ensuing description and drawings.

REFERENCE NUMERALS IN DRAWINGS

20=Antennae
21=Low Impedance Path
22=Transmitter
23=Receiver
24=Power Communication System
25=Power Communication System Send Method
26=Power Communication System Receive Method
27=Power Transmission Line
28=Electrical Outlet
29=Electrical Path to Power Distribution Network
30=Electrical Path to Power Transmission Line
31=Electrical Utility Distribution
32=Electric Path to Transmitter, Receiver, and Power Communication System
33=Power Supply which is charged through Inductive Coupling
34=Battery Power Supply
35=Electric Light Bulb
36=Site 1 of a User
37=Power Transformer
38=Local Electric Utility Distribution
39=Local Electric Utility Distribution Substation
40=Control Center
41=Network Transmission Station
42=Microwave Tower
43=High Voltage Power Distribution Network
44=Telephone Central Office (Local Exchange)
45=Site 2 to N of a User
46=Inductive Coupling
47=Signal Processor
48=Computer
49=Server
50=Network Switch
51=Cable
52=Telco
53=Internet
54=Maser
55=Q-Switch
56=Synthetic Aperture Switch
57=Wireless Subscriber Device
58=Power Communication System Interface
59=RF System with Antennae, Receiver, and Transmitter.

Figure 1:
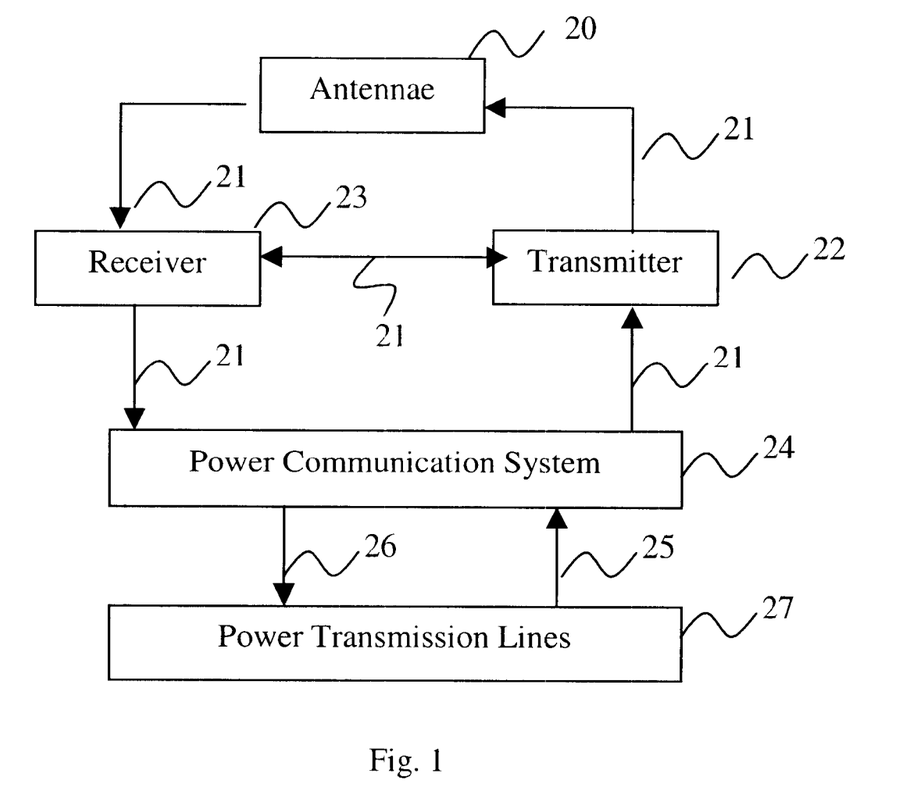
FIG. 1 is a diagrammatic illustration of the system claimed.
Figure 2:
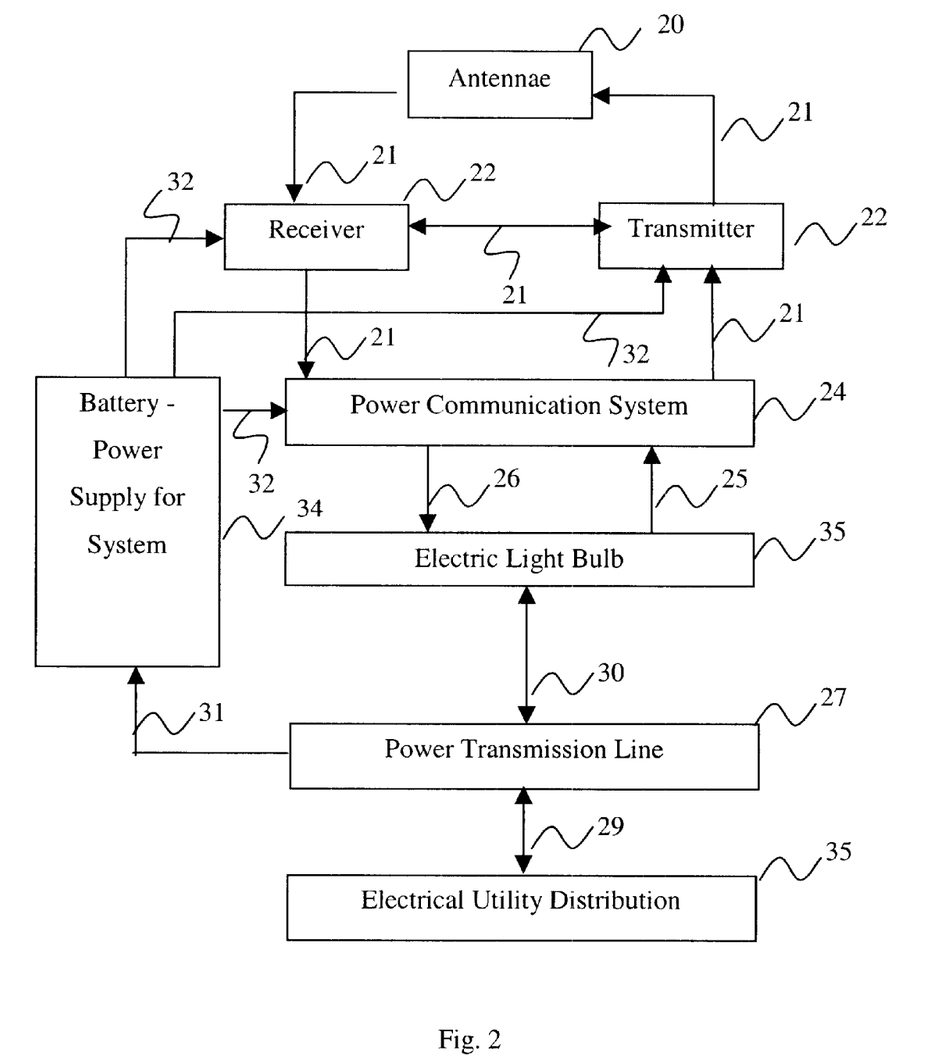
FIG. 2 is a diagrammatic illustration of the presently preferred system of the present invention capable of carrying out the presently preferred method of the present invention.

Description—FIGS. 1–2—Preferred Embodiment

Referring now to the drawings in detail, and initially to FIG. 1, which is an elemental embodiment of the system claimed. The system has antennae 20 which allows for the reception and transmission of impulse or conventional modulated signals. An antenna is directly connected to a conventional receiver 23 by using a low impedance path 21. The antenna is also directly connected to a conventional transmitter 22 by means of a low impedance path 21. A receiver 30 is directly connected to transmitter 22 by using a low impedance path 35. The low impedance path 21 allows for exchange of data from the receiver to the transmitter and from the transmitter to the receiver. Receiver 23 sends data to a power communication system 24 through a low impedance path 21. Transmitter 22 receives data from the power communication system 24 through a low impedance path 21. The power communication system 24 sends data signals to a power transmission line 28 by a power communication system send method 25. The power communication system 24 receives data signals from power transmission lines 27 by a power communication system transmit method 26. A low impedance path 21 is made out of a low impedance material such as copper. The bi-directional coupling means specified in the claims that uses the low impedance path 21 can be the same low impedance path used by all bi-directional coupling means.

Referring now to FIG. 2, a presently preferred embodiment, a system for coupling a wireless signal to a power transmission line by electrically interfacing with a power transmission line communication system is integrated with an electric light bulb that can physically attach to any power transmission line is shown. The system has antennae 20 which allows for the reception and transmission of impulse or conventional modulated signals. The antenna is directly connected to a conventional receiver 23 by using a low impedance path 21. The antenna is also directly connected to a conventional transmitter 22 by means of a low impedance path 21. Receiver 23 is directly connected to transmitter 22 by using a low impedance path 21. The low impedance path 21 allows for exchange of data from the receiver to the transmitter and from the transmitter to the receiver. Receiver 23 sends data to a power communication system 24 through a low impedance path 21. Transmitter 22 receives data from the power communication system 24 through a low impedance path 21. The power communication system 24 can send data through an electrical light bulb 35 connected to an electrical path through a power communication send method 25. The power communication system 24 can receive data through an electric light bulb 35 connected to an electrical path through a power communication receive method 26. Electric light bulb 35 is connected to a power transmission line 27 by an electrical path to a power transmission line 30. Power transmission line 27 is connected to electric utility distribution 31 by an electrical path to an electrical utility distribution 29. The power supply 33 created by direct contact with an electrical path to a power transmission line 30 can act like a battery when the power transmission line 31 is disconnected. The power supply 33 can provide electrical energy to transmitter 22, receiver 23, and power communication system 24. A low impedance path 21 is made out of a low impedance material such as copper. The bi-directional coupling means specified in the claims that uses the low impedance path 21 can be the same low impedance path used by all bi-directional coupling means.

Operation—FIGS. 1–2—Preferred Embodiment

To date, however, no system has been proposed which can make effective use of the extensive and growing bi-directional networks of power transmission lines already existing or installed, particularly in urban and suburban areas, for wireless data communication purposes.

The best mode of practice of the invention is divided into six different parts. The first part is a receiver that can capture secure data that includes voice, video, and telecommunication information. The receiver captures digital and analog signals that are modulated with high or low frequency carriers. The carrier has a sub-carrier that is modulated with a conventional modulation technique such as analog modulation, frequency modulation, amplitude modulation, phase modulation, QPSK modulation, GSM, CDMA, TDMA, or ultra-wide band time domain based technology. The best mode of practice uses impulse modulation in accordance with ultra-wide band time domain based technology. Impulse modulation is a modern modulation technique that decreases power output while ten fold increasing the data bandwidth. The sub-carrier also uses impulse modulation is the best mode of modulation. The second part is a transmitter. The transmitter can send secure data that can be modulated with any conventional technique. Both the transmitter and receiver will be able to talk to other wireless devices through an antennae and a secure standard protocol such as TCP/IP, ATM, IEEE 802.11, HiperLan, and Bluetooth. The third part, which is the antennae, can be retractable, hidden, or fixed. The fourth part is a power communications network. The best mode of practice uses a power communication network that is magnetic based which interfaces with the transmitter and receiver through a low impedance path. The low impedance path is an electrical connection that uses a low impedance material such as copper. The fifth part of this invention is the integration of the first, second, third, and fourth part with an electric light bulb. The six part, a power supply, can supply electrical power directly or act like a battery when the electrical path has been disconnected.

The cost effective light bulb integrated with a fixed wireless unit that can send and receive data over a power communications network can be rolled out very quickly throughout a municipal or rural area. A halogen light can also be integrated with the antennae, receiver, transmitter, and a power communications network. The integrated system may have a light detector to allow the system to turn on and off the light in relation to the time of day. This cost effective integrated system can be installed to allow for substantial coverage of local wireless subscriber devices by just replacing the existing street light bulbs. This could be accomplished in a fraction of the time that it takes to install a wireless communication network such as a microwave tower. Moreover, the installation could be accomplished by anybody compared to a professional microwave tower installer. The wireless communication light bulb can also be introduced to the office site and home environment. This would allow an individual to connect to the Internet, to wirelessly connect their computers over a local area wireless network, to receive and send video conferencing, and to receive and send voice data free from building interference. The best mode of practice of the invention can be accomplished by integrating a fixed antennae, transmitter, receiver, and power communication system inside a light bulb. The best mode of practice can also be accomplished by placing the antennae, transmitter, receiver, and power communication system inside an enclosure that the electric light bulb can screw its threads into just like an electrical socket. Then this enclosure can screw into a electrical socket or street lamp socket.

Prior art before U.S. Pat. No. 5,982,276 focused on the electric field component of power transmission. U.S. Pat. No. 5,982,276 focused on the magnetic field component of power transmission using existing power distribution networks and existing microwave towers. The presently preferred embodiment utilizes both the electric field component and magnetic field component of power transmission. The electrical field component of an existing light socket of the presently preferred embodiment enables the wireless transmission that is not "anticipated" by U.S. Pat. No. 5,982,276. Furthermore, the presently preferred embodiment of light bulbs talking to one another to orientate its power output and coverage area would not be "anticipated" by of a power communication system interfacing with existing microwave towers which do not interface with other existing microwave towers. The use of a microwave tower is expensive, is non-upgradeable, needs professional installation, needs an extensive installation period, is bandwidth limited, is frequency limited, is coverage area limited, does not function in rural areas, works independently of other microwave towers, needs special construction governmental permits, has constant output power, has high signal radiation, is environmentally unfriendly, and has a large visual profile. The use of a network of light bulbs integrated with an antennae, receiver, transmitter, and power communication system is cost effective, up-gradable, easily installable in seconds, has a high bandwidth, has a large frequency range, can cover large areas including rural areas, works together with nearby light bulbs integrated with an antennae, receiver, transmitter, and power communication system, needs no special construction permit, has dynamic output power, has low signal radiation, is environmentally safe, has a low profile, and is a commodity item. The receiver and transmitter would operate at low power output and using a UNII frequency that it would not need a permit by the FCC. The microwave tower would need FCC approval to function. The use of a wireless subscriber device with a microwave tower is billed on minute-by-minute bases because private corporations own the towers. The use of the presently preferred embodiment would be billed on a monthly surcharge because private individuals, government agencies, and private corporations would own and borrow the light bulbs communication ability.

This best mode of practice of this invention can calculate distances to any nearby wireless device. By transmitting a time-synchronized synchronization signal to the device from at least three different nearby devices, the time-synchronized synchronization signal provides time information that can be used to position the wireless device. The system by determining the location of nearby device, can correct the power output so as to limit or expand its transmission power to exactly match the distance between nearby devices.

From the foregoing, it will be observed that numerous variations and modifications can be effected without departing from the spirit and scope of the novel concept of the invention. It is to be understood that no limitation with respect to the specific methods and apparatus illustrated herein is intended or should be inferred, but provided to define the best mode of practice which this embodiment defines It is, of course, intended to cover by the appended claims all such modifications as fall within the scope of the claims.

Advantages—FIGS. 1–2—Presently Preferred Embodiment

From the description above, a number of advantages of my system for coupling a wireless signal to and from a power transmission line become evident:

(a) The coupling system overcomes the disadvantages of the prior art by providing for more wireless subscribers per square area compared with conventional wireless communication sites.

(b) The coupling system overcomes the disadvantages of the prior art by creating more bandwidth per user compared with conventional wireless communication sites.

(c) The coupling system overcomes the disadvantages of the prior art by allowing for the instantaneous handoff of wireless subscribers as they move around from site to site. A subscriber device may have multiple connections to several nearby devices which can act as portals to the power communication system. A subscriber device may also connect to other wireless subscriber devices which can act as portals to the power communication system.

(d) The coupling system allows for a wireless communication system that has an upgradeable standard communication protocol.

(e) The coupling system overcomes the disadvantages of the prior art by providing more exact locations of wireless subscribers. The area of the local area of a site is measured in feet instead of miles. Therefore, the location of wireless subscribers is measured in inches instead of feet.

(f) The coupling system overcomes the disadvantages of the prior art by allowing for the wireless subscriber to receive wireless television or radio signals in a remote area.

(g) The coupling system overcomes the disadvantages of the prior art by decreasing the overall radiation of a site to be exactly proportioned by the distance from nearby sites. This creates a wireless network with power that exactly covers an area through dynamic power correction. Conversely, a conventional communication tower radiates static power distribution with excessive radiation.

(h) The coupling system overcomes the disadvantages of the prior art by constructing a wireless network that can be quickly installed and used in rural areas with no conventional wireless communication system.

(i) The coupling system overcomes the disadvantages of the prior art by allowing wireless subscriber devices to share processor and memory resources with other nearby devices to create a multiprocessor unit.

(j) The coupling system overcomes the disadvantages of the prior art by allowing increased bandwidth without interfering with long wave radio signals.

(k) The coupling system overcomes the disadvantages of the prior art by providing an easily installable wireless network by simply screwing in a light bulb or halogen light. The devices can light city streets and major highways. The rollout of a wireless power communication system can be accomplished in a relative short time by just changing out the street lamp bulbs.

(l) The coupling system overcomes the disadvantages of the prior art by the fact that street lamps and housing lighting covers more square area than any conventional subscriber wireless network.

(m) The coupling system overcomes the disadvantages of the prior art by providing wireless statistical information about lighting usage to electric power companies.

(n) The coupling system overcomes the disadvantages of the prior art by providing a known apparatus like the light bulb that every person in the world can install compared to the expensive experienced engineer needed to install a cellular network.

Figure 3:
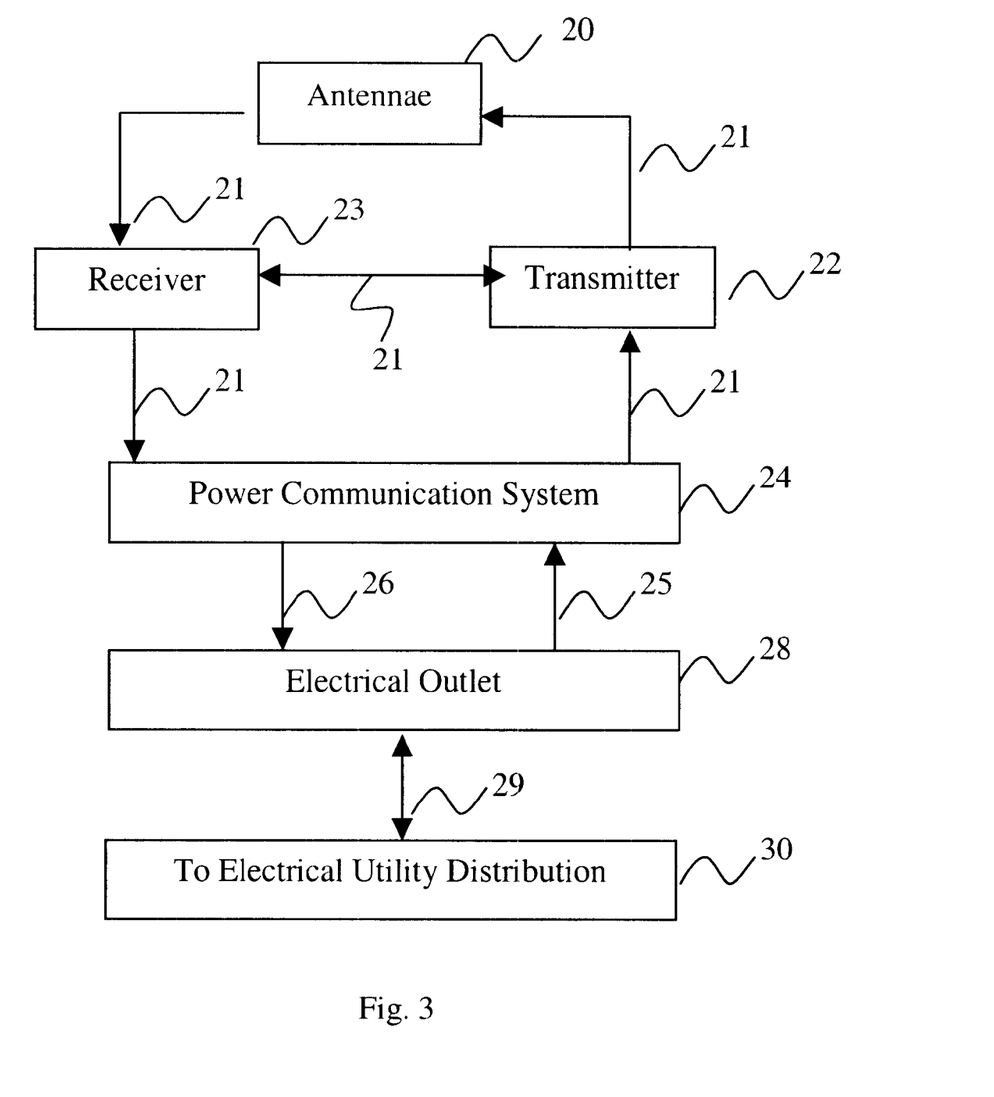
FIG. 3 is a diagrammatic illustration of a second embodiment in accordance with the present invention.

Description—FIG. 3—Additional Embodiment

Referring now to FIG. 3, an additional embodiment for communicating information to and from a wireless subscriber device by the use of a power transmission line communication system interfacing to a conventional electric power distribution is shown. The system has antennae 20 which allows for the reception and transmission of impulse or conventional modulated signals. The antenna is directly connected to a conventional receiver 23 by using a low impedance path 21. The antenna is also directly connected to a conventional transmitter 22 by means of a low impedance path 21. Receiver 23 is directly connected to transmitter 22 by using a low impedance path 21. The low impedance path 21 allows for exchange of data from the receiver to the transmitter and from the transmitter to the receiver. Receiver 23 sends data to a power communication system 24 through a low impedance path 21. Transmitter 22 receives data from the power communication system 24 through a low impedance path 21. The power communication system 24 can send data to through an electrical outlet 28 by a power communication system send method 25. The power communication system 24 can receive data from an electrical outlet 28 by a power communication system receive method 27. The electrical outlet 28 is connected to electrical utility distribution 31 by an electrical path to power distribution network 29. The electrical outlet 28 can provide electrical energy to transmitter 22, receiver 23, and power communication system 24. A low impedance path 21 is made out of a low impedance material such as copper. The bi-directional coupling means specified in the claims that uses the low impedance path 21 can be the same low impedance path used by all bi-directional coupling means.

Operation—FIG. 3—Additional Embodiment

The additional embodiment is divided into five different parts. The first part is a receiver. The receiver functions exactly like the preferred embodiment description. The second part is a transmitter. The transmitter also functions exactly like the preferred embodiment description. The third part, which is the antennae, can be retractable, hidden, or fixed. The fourth part is a power communications network. The power communication network may be magnetic based which interfaces with the transmitter and receiver through a low impedance path. The fifth part of this invention is the integration of the first, second, third, and fourth part with an electrical outlet.

By allowing an individual to install this system, the individual may attach this instantaneously to any electrical outlet within seconds. This creates a local wireless network that can function and operate with cellular phones and other wireless devices.

Advantages—FIG. 3—Additional Embodiment

In addition to and comprising the advantages of the preferred embodiment, a number of additional advantages of an additional embodiment of my system for coupling wireless signals to and from a power transmission line communication system become evident:

a) The coupling system overcomes the disadvantages of the prior art by not using a conventional wireless communication sites that takes long periods of time to construct, instead of seconds to attach.

b) The coupling system overcomes the disadvantages of the prior art by the fact that there are more electrical outlets compared to microwave towers.

c) The coupling system overcomes the disadvantages of the prior art by the fact that private individuals are willing to share their electrical outlet resources in exchange for usage of other private individuals' electrical outlet resources. Conversely, private corporations are not willing to share their expensive assets such as microwave towers.

Figure 4:
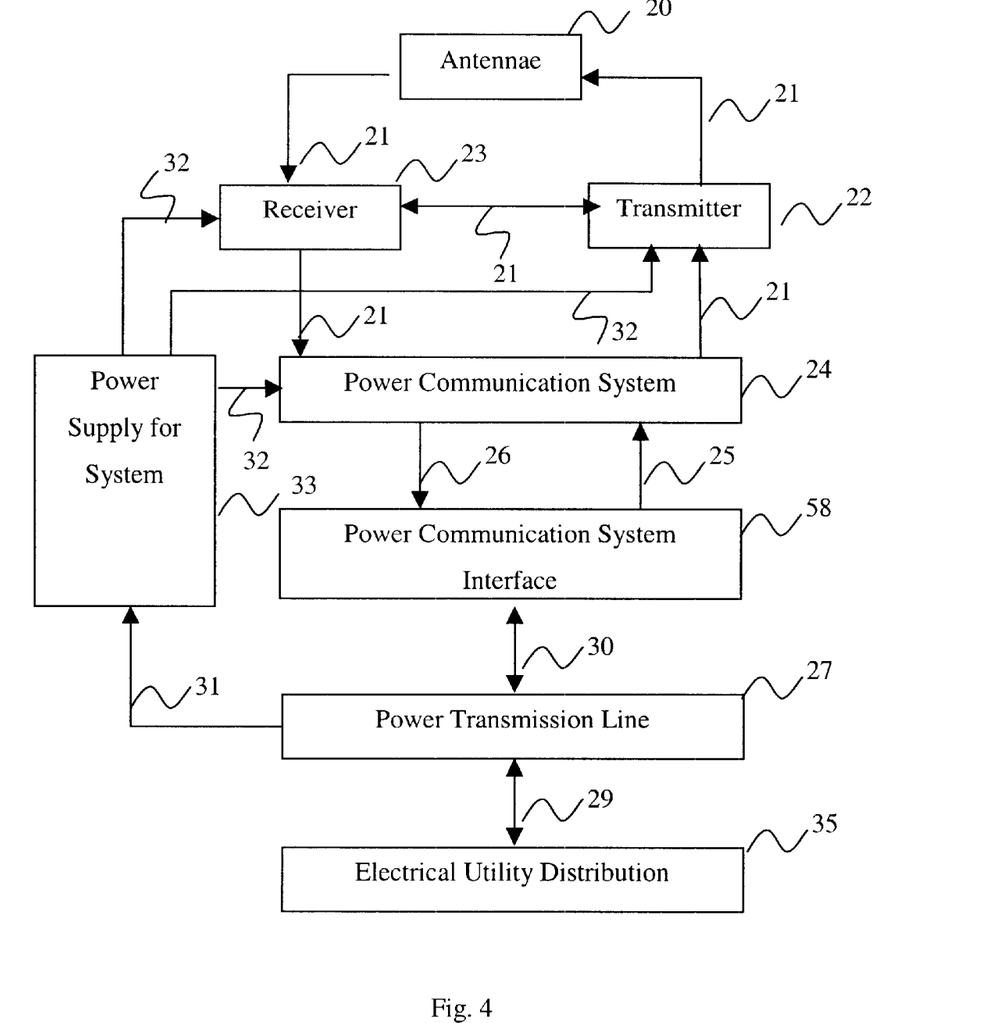
FIG. 4 is a diagrammatic illustration of a third embodiment in accordance with the present invention.

Description—FIG. 4—Additional Embodiment

Referring now to FIG. 4, an additional embodiment of a system for communicating information to and from a wireless subscriber device by the use of a power transmission line communication system interfacing to a conventional electric power distribution is shown. The system has antennae 20 which allows for the reception and transmission of impulse or conventional modulated signals. The antenna is directly connected to a conventional receiver 23 by using a low impedance path 21. The antenna is also directly connected to a conventional transmitter 22 by means of a low impedance path 21. Receiver 23 is directly connected to transmitter 22 by using a low impedance path 21. The low impedance path 21 allows for exchange of data from the receiver to the transmitter and from the transmitter to the receiver. Receiver 23 sends data to a power communication system 24 through a low impedance path 21. Transmitter 22 receives data from the power communication system 24 through a low impedance path 21. The power communication system 24 can send data to a magnetic based power communication interface 29 through a power communication send method 25. The power communication system 24 can receive data from a magnetic based power communication system interface 29 through a power communication receive method 26. Power communication system interface 29 can send and receive data from a power transmission line 27 by an electrical path to a power transmission line 30. Power transmission line 27 is connected to electric utility distribution 31 by an electrical path to an electrical utility distribution 29. A power supply 33 is charged through a magnetic inductive coupling to an electrical path to power transmission line 30. The power supply 33 created by magnetic induction can provide electrical energy to transmitter 22, receiver 23, and power communication system 24. A low impedance path 21 is made out of a low impedance material such as copper. The bi-directional coupling means specified in the claims that uses the low impedance path 21 can be the same low impedance path used by all bi-directional coupling means.

Operation—FIG. 4—Additional Embodiment

The additional embodiment is also divided into six different parts. The first part is a receiver. The receiver functions exactly like the preferred embodiment description. The second part is a transmitter. The transmitter also functions exactly like the preferred embodiment description. The third part, which is the antennae, can be retractable, hidden, or fixed. The fourth part is a power communications network. The power communication network may be magnetic based which interfaces with the transmitter and receiver through a low impedance path. The fifth part of this invention is the integration of the first, second, third, and fourth part with an electrical outlet. The six part of this invention is a power supply that inductively couples to a power transmission line.

The additional embodiment can attach to any power transmission line by simply attaching around a power transmission line. The additional embodiment can be supplied by power by inductively coupling to the magnetic component or electrically coupling to the power transmission line. It also can send and receive data through the power communication system, and send and receive data from and to any wireless subscriber device using a standard secure protocol.

Advantages—FIG. 4—Additional Embodiment

In addition to and comprising the advantages of the preferred embodiment, a number of additional advantages of an additional embodiment of my system for coupling wireless signals to and from a power transmission line communication system become evident:

(a) An alternative embodiment of the coupling system overcomes the disadvantages of the prior art by providing a means for wireless communications along any road with power transmission lines especially in rural and areas without a cellular infrastructure.

(b) An alternative embodiment of the coupling system overcomes the disadvantages of the prior art by easily surrounding and attaching to a power transmission line within seconds.

(c) An alternative embodiment of the coupling system overcomes the disadvantages of the prior art by providing a cost effective and publicly available network that can be used for emergency communication in urban and rural areas.

(d) An alternative embodiment of the coupling system overcomes the disadvantages of the prior art by allowing a real time tracking of inventory, taxes, toll charges, and individuals.

(e) An alternative embodiment of the coupling system overcomes the disadvantages of the prior art by providing a system that does not have to directly connect with the power transmission line. The system connects through magnetic inductive coupling.

(f) An alternative embodiment of the coupling system overcomes the disadvantages of the prior art by providing wireless statistical information about electrical usage for use by an electric power companies.

Figure 5:
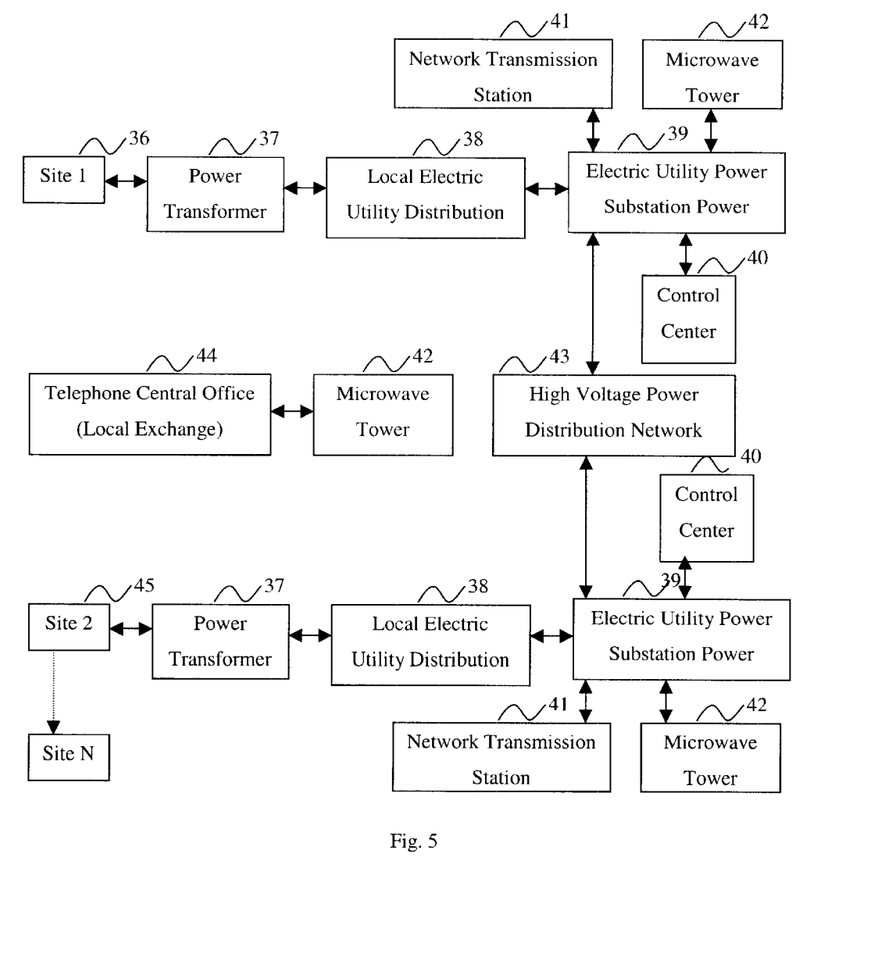
FIG. 5 is a representation of a prior art of a national power distribution network that can distribute electrical power to customer's premise through a magnetic field based power transmission line communication method and system.
Figure 6:
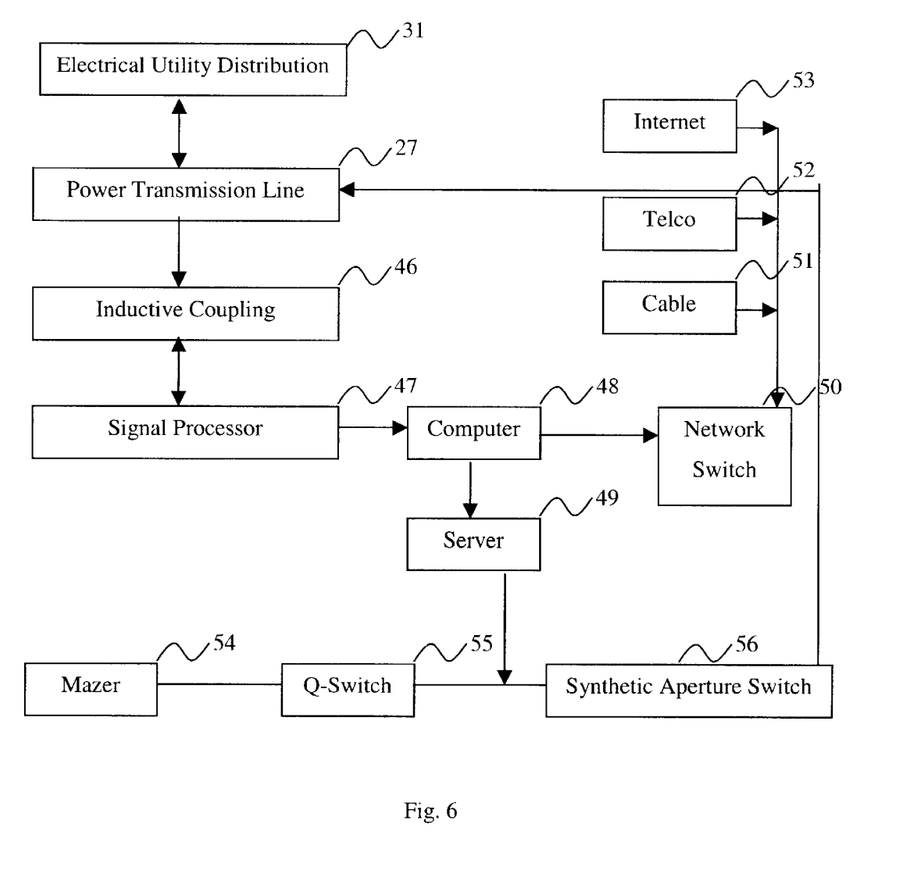
FIG. 6 is a representation of a prior art of a magnetic field based power transmission line communication method and system.
Figure 7:
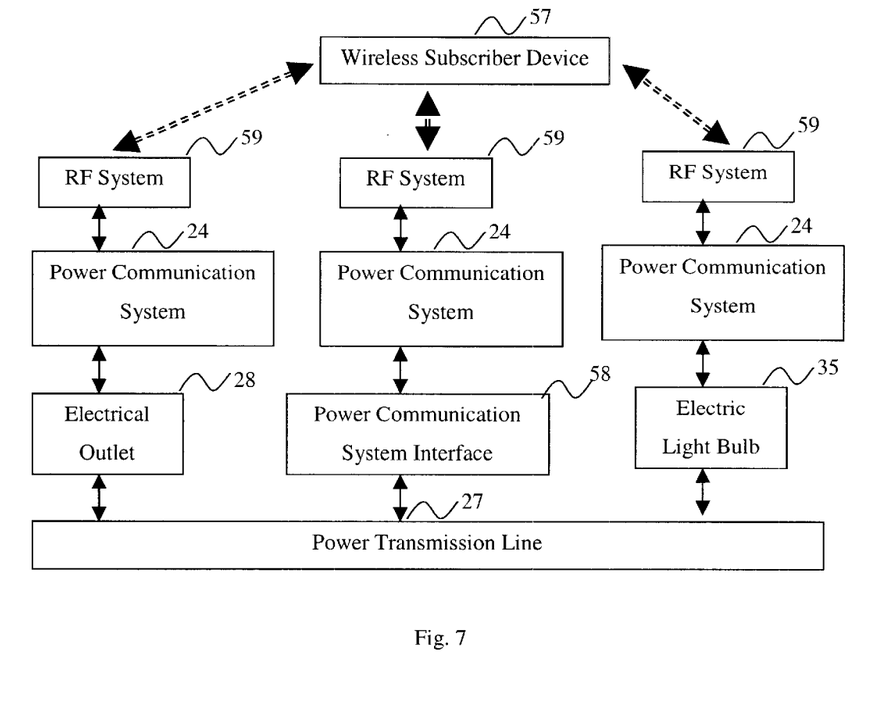
FIG. 7 is a diagrammatic illustration of a typical interaction between the present preferred embodiment of this invention, the second embodiment of this invention, the third embodiment of this invention, and a wireless subscriber device.

Description—FIGS. 5–7

As shown by way of illustration in FIG. 5, the conventional power distribution network used for distributing electrical power nationally includes a conventional high voltage power distribution network 43 which contains high voltage power transmission lines, conventional electric utility power substations 39, conventional local electric utility power distribution 38 for distributing the power from the high voltage power distribution network 43 to the local subscribers or users at diverse electrical locations represented by sites 1 through N, 20, 22, 24 via the power transmission lines and conventional power transformers 37. Up to this point, the system is a conventional power distribution network for transmitting electricity in the form of electromagnetic waves carried over the power transmission lines throughout the power distribution network. The sole use of the power distribution network, not having a power transmission line communication system, is to deliver electrical power to the customer premise.

FIG. 6 illustrates a magnetic based power network communication system, a prior art apparatus of U.S. Pat. No. 5,982,276. This prior art comprises a method and system for communicating information between subscribers over power transmission lines which normally convey electrical power to a plurality of diverse electrical sites for providing electrical power to electrical devices disposed at these diverse electrical sites. The subscribers on the communication network are located at these electrical sites. The electrical power conveyed over the power transmission lines is in the form of electromagnetic radiation that has an electrical field component and an orthogonal and interdependent or associated magnetic field component. The information, such as telephone voice communication or other data, is transmitted in the magnetic field component of the electromagnetic radiation carried over the power transmission line, such as by exciting the field with a MASER, in order to enable communication between the subscribers at the various electrical sites. The system enables selective reception of the transmitted communication using standard information protocol addressing.

FIG. 7 is a representation of a typical interaction between the present preferred embodiment of this invention, the second embodiment of this invention, the third embodiment of this invention, and a wireless subscriber device. This illustration shows that a system can have several different elements involved, and these elements can all send and receive data from a wireless subscriber device. These elements can also determine distance and calculate correct signal output power.

Conclusion, Ramifications, and Scope

Thus the reader will see that a system for coupling wireless signals to and from a power transmission line communication system provides a highly reliable, yet economical device that can be used by persons of almost any age. The additional embodiment of this invention shows that the coupling system can be made through an electrical outlet. The alternative embodiment of this invention demonstrates that the coupling system can attach, inductively gain energy, and communicate with a power communication system. This invention is neither bandwidth limited nor frequency limited. Furthermore, the invention has the additional advantages in that:

- The coupling system is distributed by any retail method.
- The coupling system does not permit alterations.
- The coupling system is effortlessly installed.
- The coupling system has a hidden or retractable antennae design;
- The coupling system has a secure radio frequency component.
- The coupling system has a standard and high bandwidth protocol.
- The coupling system has a dynamic level of security.
- The coupling system can interact with other wireless devices.
- The coupling system can interface with a digital signal processor.
- The coupling system can interface with a microprocessor.
- The coupling system can share its resources and processing power with other networks to create a parallel processing network.
- The coupling system can function as radar.
- The coupling system can function as a security system.
- The coupling system can securely purchase and sell objects.
- The coupling system can locate wireless devices.
- The coupling system can dynamically change its output signal power.
- The coupling system can track objects.
- The coupling system can be easily installed.
- The coupling system can synchronize a subscriber's environment, address book, tasks, and calendar in real time.
- The coupling system can transmit and receive video conferencing from a wireless subscriber device.
- The coupling system can allow multi-player recreation computer games to be played across the power communication network.
- The coupling system can be integrated with an electric light bulb. This electric light bulb can be halogen, fluorescent, incandescent, infrared, or ultraviolet.

While my above description contains much specificity, these should not be construed as limitations on the scope of the invention, but rather as an exemplification of one preferred embodiment thereof. Many other variations are possible. For example, Instead of using a radio frequency as a carrier for data, the invention may use a different medium such as infrared, light, and sound.

The invention can also use other devices to facilitate coupling of a radio signal to a power transmission line such as power transformers, noise suppression devices, electrical power strips, home appliances, and traffic lights.

The invention can also eliminate the receiver and only be able to send data from the power communication network through the transmitter.

The invention can also eliminate the transmitter and only be able to receive data to the power communication network through the receiver.

The invention can also use many different forms and sizes of the antennae such as the dipole antennae or the planar antennae.

Accordingly, the scope of the invention should be determined not by the embodiment(s) illustrated, but by the appended claims and their legal equivalents.

Sequence Listing

Not applicable.

I claim:

1. A system for varying or keeping constant the signal power of all untethered devices not physically connected to a power transmission communication network or all tethered devices electrically connected to a power transmission line communication network, and reassigning a first untethered device according to the positioning or received signal power between the first untethered device and a second tethered device within a first cell and a different tethered device within the first cell or a second cell, the system comprising:

a. a first untethered device not physically connected to a power transmission communication network comprising:
 i. an antenna;
 ii. a transceiver to send and receive information;
 iii. a bi-directional coupling means, between said transceiver and said antenna; and
 iv. a communication protocol;

b. a second tethered device electrically connected to a power transmission communication network within a first cell comprising:
 i. an antenna;
 ii. a transceiver to send and receive information;
 iii. a bi-directional coupling means, between said transceiver and said antenna;
 iv. a power transmission line communication system;
 v. a bi-directional coupling means, between said transceiver and said power transmission line communication system; and
 vi. a communication protocol;

c. a means for determining positioning or signal power of all untethered devices and tethered devices within wireless range;

d. a means for varying or keeping constant the signal power output of all untethered devices in proportion to positioning or received signal power between each untethered device and farthest device within wireless range;

e. a means for varying or keeping constant the signal power output of all tethered devices in proportion to positioning or received signal power between each tethered device and farthest device within wireless range to create a new first cell with new wireless radius that may or may not overlap with the second cell;

f. a means for evaluating by the second tethered device if the positioning or received signal power of the first untethered electrical device is more optimally connected to the different tethered device;

g. a means for communicating through a power transmission line communication network or through wireless communication to the different tethered device to analyze the different tethered device's positioning or received signal power from first untethered device, and capacity to connect to the first untethered device; and h. a means for requesting a handoff through a power transmission line communication network or through wireless communication with the different tethered device such that the different tethered device connects to the first untethered electrical device while the second tethered device disconnects from the first untethered device.

2. A system in accordance with claim 1, wherein the communication protocol is secure and used to identify a device through network addressing method.

3. A system in accordance with claim 1, wherein the communication protocol can be directly altered or updated using the power transmission line network.

4. A system in accordance with claim 1, wherein the tethered device can be entirely housed in a sunlight photo detector attached to a utility pole, or in an apparatus screwed into a light socket, or an enclosure inductively attaching around a power transmission line, or an enclosure plugging into an electrical outlet, or an enclosure hanging from a utility pole.

5. A system for varying or keeping constant the signal power of all untethered devices not physically connected to a power transmission communication network or all tethered devices electrically connected to a power transmission line communication network, and reassigning a first untethered device according to the positioning or received signal power between the first untethered device and a second tethered device within a first cell and a different untethered device wirelessly connected to a different tethered device within the first cell or a second cell, the system comprising:

a. a first untethered device not physically connected to a power transmission communication network comprising:
     v. an antenna;
     vi. a transceiver to send and receive information;
     vii. a bi-directional coupling means, between said transceiver and said antenna; and
     viii. a communication protocol;
   b. a second tethered device electrically connected to a power transmission communication network within a first cell comprising:
     i. an antenna;
     ii. a transceiver to send and receive information;
     iii. a bi-directional coupling means, between said transceiver and said antenna;
     iv. a power transmission line communication system;
     v. a bi-directional coupling means, between said transceiver and said power transmission line communication system; and
     vi. a communication protocol.
   c. a means for determining positioning or signal power of all untethered devices and tethered devices within wireless range;
   d. a means for varying or keeping constant the signal power output of all untethered devices in proportion to positioning or received signal power between each untethered device and farthest device within wireless range;
   e. a means for varying or keeping constant the signal power output of all tethered devices in proportion to positioning or received signal power between each tethered device and farthest device within wireless range to create a new first cell with new wireless radius that may or may not overlap with the second cell;
   f. a means for evaluating by the second tethered device if the positioning or received signal power of the first untethered electrical device is more optimally connected to the different untethered device wirelessly connected to the different tethered device;
   g. a means for communicating through a power transmission line communication network to the different tethered device wirelessly connected to the different untethered device or through wireless communication to the different untethered device to analyze different untethered device's and different tethered device's positioning or received signal power from first untethered device, and capacity to connect to the first untethered device; and
   h. a means for requesting a handoff by the second tethered device through a power transmission line communication network to the different tethered device wirelessly connected with the different untethered device or through a wireless communication with the different untethered device such that the different untethered device simultaneously connects the first untethered device through the different untethered device to the different tethered device while the second tethered device disconnects from the first untethered device.

6. A system in accordance with claim 5, wherein the communication protocol is secure and used to identify a device through network addressing method.

7. A system in accordance with claim 5, wherein the communication protocol can be directly altered or updated using the power transmission line network.

8. A system in accordance with claim 5, wherein the tethered device can be entirely housed in a sunlight photo detector attached to a utility pole, or in an apparatus screwed into a light socket, or an enclosure inductively attaching around a power transmission line, or an enclosure plugging into an electrical outlet, or an enclosure hanging from a utility pole.

9. A system for adjusting the signal power of all untethered devices not physically connected to a power transmission communication network or all tethered devices electrically connected to a power transmission line communication network, and reassigning a first untethered device according to location, latency, or received signal power between the first untethered device and a second tethered device within a first cell and a different tethered device within the first cell or a second cell, the system comprising:

a. a first designated untethered subscriber device not physically connected to a power transmission communication network comprising:
     i. an antenna;
     ii. a transmitter to send information;
     iii. a receiver to receive information;
     iv. a bi-directional coupling means, between said transmitter and said receiver;
     v. a bi-directional coupling means, between said transmitter and said antenna;
     vi. a bi-directional coupling means, between said receiver and said antenna;
     vii. a clock source operating at a higher frequency than a power line electrical frequency; and
     viii. a secure communication protocol including a means to identify a device through a network addressing method that can be directly altered by using the power transmission line network through a plurality of power transformers without a wireless bypass;

b. a second tethered device electrically connected to a power transmission communication network within a first cell comprising:
  i. an antenna;
  ii. a transmitter to send information;
  iii. a receiver to receive information;
  iv. a bi-directional coupling means, between said transmitter and said receiver;
  v. a bi-directional coupling means, between said transmitter and said antenna;
  vi. a bi-directional coupling means, between said receiver and said antenna;
  vii. a power transmission line communication system without critical latency;
  viii. a bi-directional coupling means, between said receiver and said power transmission line communication system;
  ix. a bi-directional coupling means, between said transmitter and said power transmission line communication system;
  x. a clock source operating at a higher frequency than a power line electrical frequency;
  xi. a secure communication protocol including a means to identify a device through a network addressing method that can be directly altered by using the power transmission line network through a plurality of power transformers without a wireless bypass; and
  xii. an enclosure entirely housing the second tethered device in a sunlight photo detector attached to a utility pole, or in an apparatus screwed into a light socket, or an enclosure inductively attaching around a power transmission line, or an enclosure plugging into an electrical outlet, or an enclosure hanging from a utility pole;
c. a means for determining the positioning of all untethered devices or tethered devices within wireless range;
d. a means for determining the distance between the first untethered device or the second tethered device and the farthest untethered device and farthest tethered device within wireless range;
e. a means for adjusting power output in proportion to distance between first untethered device and farthest untethered device or farthest tethered device within wireless range;
f. a means for adjusting power output in proportion to distance between the second tethered device and farthest tethered device or farthest untethered device within wireless range to create a new first cell with new wireless radius that may or may not overlap with the second cell;
g. a means for evaluating by the second tethered device if the location, latency, or received signal power of the first untethered device is more optimally connected to the different tethered device;
h. a means for communicating through a power transmission line communication network or through wireless communication to the different tethered device to analyze the different tethered device's bandwidth and capacity to connect to the first untethered device; and
i. a means for requesting a handoff through a power transmission line communication network or through wireless communication with the different tethered device such that the different tethered device simultaneously connects to the first untethered device while the second tethered device disconnects from the first untethered device.

* * * * *